May 16, 1939. H. L. BEEKLEY ET AL 2,158,715
AUTOMATIC VALVE
Filed Feb. 18, 1938
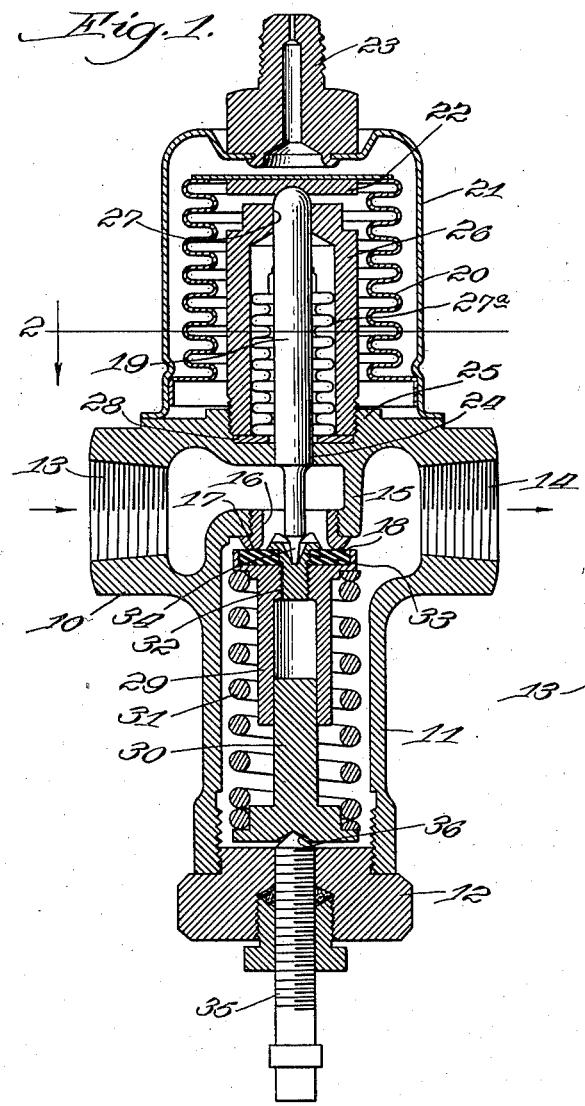
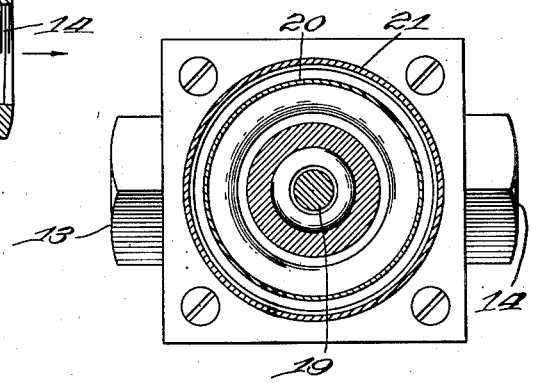
Inventors:
Henry L. Beekley and
John G. Whiting.
By Chritton, Wiles, Davis, Hirsch & Dawson.
Attys.

Patented May 16, 1939

2,158,715

UNITED STATES PATENT OFFICE 2,158,715

AUTOMATIC VALVE

Henry L. Beekley, Glen Ellyn, and John G. Whiting, Chicago, Ill., assignors to The Electrimatic Corporation, a corporation of Illinois Application February 18, 1938, Serial No. 191,340

4 Claims. (Cl. 251—137)

This invention relates to an automatic valve of the type adapted to be actuated by changes in fluid pressure.

One feature of this invention is that it provides an automatic valve of standard shape and size, having certain structural changes and improvements; another feature of this invention is that it provides improved bearing and aligning means for the movable actuating stem; still another feature of this invention is that it provides improved means for maintaining the valve member in proper relationship with its cooperating annular surface; other features and advantages of this invention will be apparent from the following specification and the drawing, in which:

Fig. 1 is a vertical sectional view of a valve embodying our invention; and Fig. 2 is a horizontal sectional view along the line 2 of Fig. 1.

The valve disclosed herewith is of the type designed to control fluid flow in accordance with the change in pressure in a secondary fluid, which may be temperature controlled, for example. It comprises a main valve casing 10 having a depending cylindrical portion 11, this latter portion being closed by a cap 12 threaded therein. The main or flow portion of the casing has an inlet opening 13 and an outlet opening 14, these openings being adapted to be connected to conventional conduits, and a central partition 15 separating the inlet from the outlet. The partition has an opening 16 therethrough to permit the flow of fluid from the inlet to the outlet, and is surrounded with an annular shoulder or surface 17 with which a valve member 18 cooperates. The valve member per se may be of gasket material, or some other material having sufficient resilience to insure good sealing contact with the annular surface 17.

The valve is also provided with a stem 19, so mounted as to be longitudinally movable to effect movement of the valve member with respect to its cooperating surface. The valve member is normally urged toward its cooperating surface by means hereinafter to be described, and fluid pressure actuated means operates through the stem to move the valve member away from the surface to regulate the flow of fluid through the opening 16, and thus through the valve.

The fluid pressure actuating means comprises a Sylphon 20 sealed to the casing at its lower end, either directly or through being sealed to the housing 21 which surrounds it. The Sylphon 20 is closed at the top, reinforcing means 22 being provided where it contacts the stem 19, which means may be in the form of a metal slug or washer having a depression adapted to receive the top of the stem. The housing 21 is provided with a connecting nipple 23 through which fluid under pressure may be admitted, as from a fluid thermostat. The fluid lies between the Sylphon 20 and the housing 21, and its pressure acts upon the top of the Sylphon and, through the metal member 22, determines the position of the longitudinally movable stem 19, and thus of the valve member.

The portions of the valve heretofore described are substantially conventional. The method of mounting and sealing the longitudinally movable stem 19 and of supporting the valve member 18, however, are novel.

Heretofore, the actuating stems in valves of the particular type shown have been journalled or provided with bearing surface at only one point, this bearing being in the casing. The provision of a sealing Sylphon to prevent the flow of fluid from the valve out past the stem has heretofore prevented the use of a second bearing surface.

We now disclose and claim an improved supporting or mounting means for the actuating stem, so arranged that a Sylphon seal may be used, the parts may be readily and completely disassembled, and the over-all size and general arrangement is no different from that of a standard valve of this type; and yet two spaced bearing surfaces are provided, resulting in improved alignment of the actuating stem and negligible change in position thereof as a result of wear.

In the particular embodiment of the invention disclosed herewith, the valve casing 10 is provided with a bearing opening 24 having the stem slidably journalled therein, this surface being a fairly close fit about the stem. The casing is provided, around the bearing opening 24 and concentric therewith, with an annular internally threaded shoulder 25, adapted to receive the threaded lower end of the cylindrical bearing member 26. This cylindrical member is open at the bottom, speaking with respect to the position of the valve in the drawing, but is provided at the top with an annular closure extending inwardly to the stem, and providing a second bearing surface 27 therefor, this surface being considerably spaced from the lower bearing surface 24. The Sylphon serving to seal the opening 24 is here indicated as 27ª. This Sylphon is sealed to the stem 19 at its upper end, and to an annular washer 28 at its lower end. The washer is adapted to lie between the upper surface of the casing and the bottom of the cylindrical member 26, so that when the cylindrical member is forced down tightly thereagainst, the bottom of the Sylphon is effectively sealed to the casing about the opening 24.

The construction thus shown enables a sealing Sylphon to be used about the stem 19 without changing the shape or dimensions of the outer or second Sylphon 20, or the over-all height of the housing 21. At the same time, all of the parts may be quickly and easily removed, since when the outer housing 21 and the Sylphon 20 are removed, it is only necessary to unscrew the cylindrical bearing member 26 to remove it, whereupon the stem 19 may be lifted out of the lower bearing opening 24. The bearing surface 27 at the top of the cylindrical member provides a second or spaced bearing for the stem 19, so that small wear in either of the bearing surfaces does not result in much change in position of the stem; and the arrangement for mounting the bearing member on the casing is such that proper alignment of the bearing surfaces, and thus of the stem, is assured.

The supporting means for the movable valve member is also novel, and, in combination with the actuating stem mounting described above, provides a greatly improved valve.

The supporting means includes a pair of telescoping members 29 and 30, provided with annular shoulders between which lies a spring 31 urging the telescoping members apart. The ends of the spring are preferably a press fit about each of the telescoping members, so that the three pieces forming the supporting means are adapted to be handled as a single unit when the valve is assembled or disassembled. The upper telescoping member 29 carries the actual valve member or gasket material 18, here shown as held in place by a metal insert piece 32. This insert is provided with a conical depression 33 adapted to receive the point 34 of the actuating stem. The arrangement is such that the point 34 seeks its proper center in the conical depression 33. It will be noted that the point of contact between these parts is lower than the point of contact between the true valve member 18 and its cooperating annular surface 17, providing increased stability of valve operation.

The cap 12 closing the depending portion 11 of the valve casing has centrally mounted therethrough a stud 35, which stud provides a supporting point within the valve casing cooperating with a conical recess 36 in the lower telescoping member 30. It is readily apparent that the position of the two telescoping members is determined by a point contact at the bottom and a point contact at the top, no part of the supporting means engaging the valve casing other than at these two points. Very precise alignment of the valve member may be secured in this manner. That is, if the bearing surfaces 27 and 24 have their axis coincide with that of the stud 35, the correct position of the valve member 18 with respect to the surface 17 inevitably follows, regardless of any differences which may exist in the shape of the inner walls of the depending portion of the casing, differences in pressure between opposite sides of the spring 31, and the like. The stud 35 may be moved in or out to determine the pressure urging the valve member toward its cooperating surface, without in any way disturbing the proper alignment of the parts.

While we have shown and described certain embodiments of our invention, it is to be understood that it is capable of man modifications. Changes, therefore, in the construction and arrangement may be made without departing from the spirit and scope of the invention as disclosed in the appended claims, in which it is our intention to claim all novelty inherent in our invention as broadly as permissible, in view of the prior art.

We claim:

1. A valve of the character described for regulating fluid flow, including: a valve casing having an inlet and an outlet; a partition in said casing separating said inlet and outlet, said partition having an opening therein; a valve member adapted to close said opening; and supporting means for said valve member, said supporting means including a pair of telescoping members and a spring urging said members apart, one of said members carrying said valve member and the other making point-contact with said casing.

2. A valve of the character described for regulating fluid flow, including: a valve casing having an inlet and an outlet; a partition in said casing separating said inlet and outlet, said partition having an opening therein; a valve member adapted to close said opening; an actuating stem projecting through said opening; and supporting means for said valve member including a pair of telescoping members and a spring, one of said last mentioned members carrying said valve member and making point-contact with said stem and the other making point-contact with said casing.

3. A valve of the character described for regulating fluid flow, including: a valve casing having an inlet and an outlet; a partition in said casing separating said inlet and outlet, said partition having an opening therein; a valve member adapted to close said opening; an actuating stem projecting through said opening; means on said casing providing a supporting point in line with the axis of said stem; and supporting means for said valve member, said supporting means including a pair of telescoping members and a spring urging them apart, one of said last mentioned members carrying said valve member and making point-contact with said stem and the other of said members contacting said casing solely at said supporting point.

4. Apparatus of the character claimed in claim 3, wherein said opening is surrounded with an annular surface cooperating with said valve means, the axis of said stem being concentric with said annular surface and perpendicular to the plane thereof.

HENRY L. BEEKLEY.
JOHN G. WHITING.